United States Patent
Datta

[15] 3,638,393
[45] Feb. 1, 1972

[54] SEED HANDLING
[72] Inventor: Ranjit Kanti Datta, Reading, England
[73] Assignee: National Research Development Corporation, London, England
[22] Filed: Jan. 13, 1970
[21] Appl. No.: 2,463

[30] Foreign Application Priority Data
Jan. 14, 1969 Great Britain..........................2,270/69

[52] U.S. Cl....................................53/180, 53/184, 221/211
[51] Int. Cl. .......................................B65b 9/04, B65b 47/10
[58] Field of Search ................53/28, 180, 78, 184; 221/211; 47/56

[56] References Cited

UNITED STATES PATENTS

| | | | |
|---|---|---|---|
| 1,160,278 | 11/1916 | Gray et al. ..............................53/180 |
| 1,386,105 | 8/1921 | Gray..........................................53/180 |
| 3,240,175 | 3/1966 | Clow....................................221/211 X |
| 3,445,981 | 5/1969 | Hori......................................53/180 X |
| 3,511,016 | 5/1970 | Craig....................................53/180 X |
| 3,206,062 | 9/1965 | Rappaport..............................53/78 X |

Primary Examiner—Theron E. Condon
Assistant Examiner—E. F. Desmond
Attorney—Cushman, Darby & Cushman

[57] ABSTRACT

Apparatus for handling seedlike small articles, comprising: a longitudinally bored elongate member mounted at one end for cyclic movement of the other, free end around a closed path through an article supply station and past an article receiving station; valve means for selectively applying a vacuum to the bore of said member during movement through the supply station and to the receiving station whereat the vacuum is cut off from said member; and means for vibrating and applying draught over said member after movement through said supply station and before reaching said receiving station.

12 Claims, 4 Drawing Figures

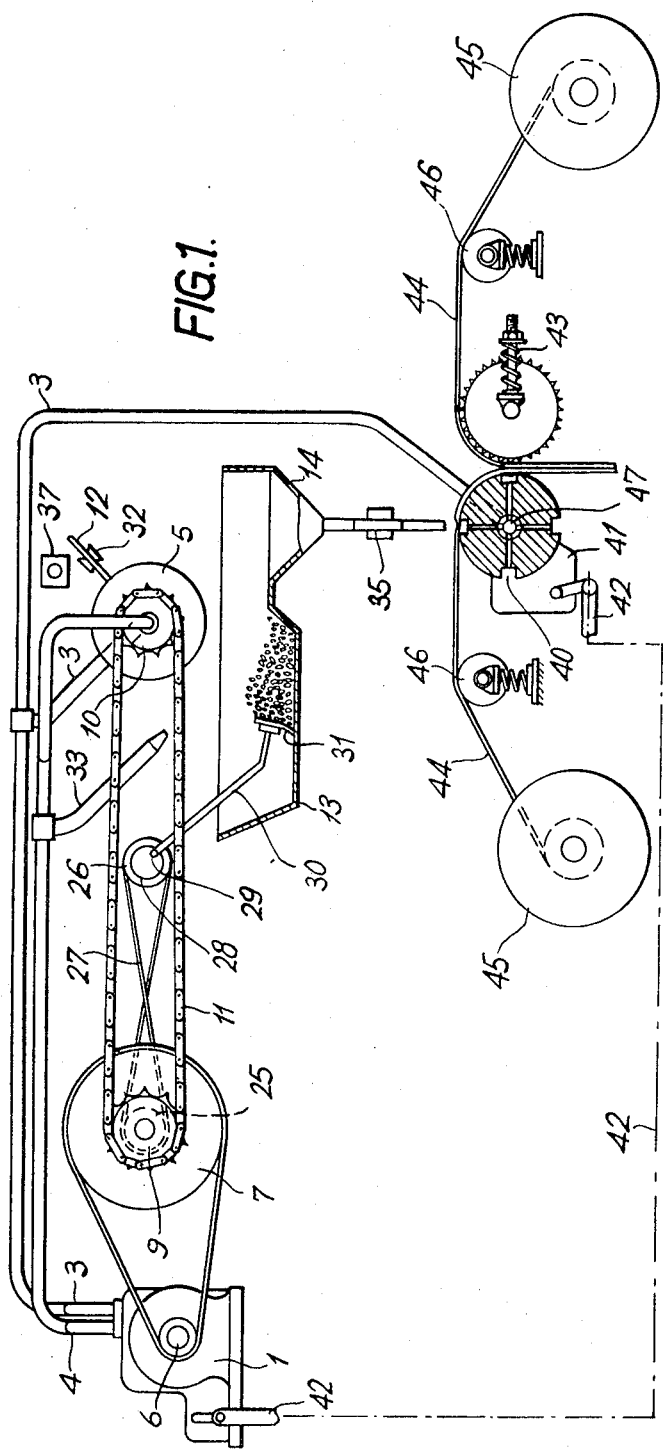
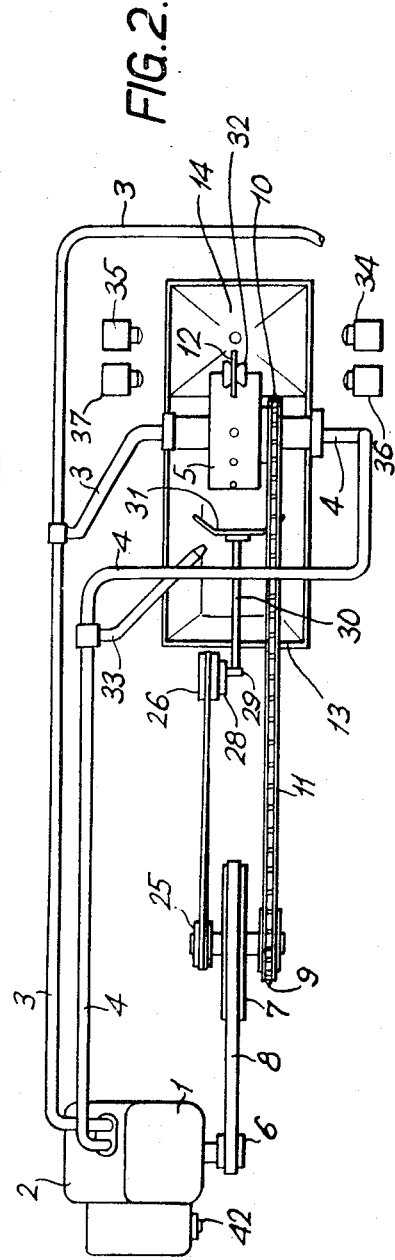
FIG.1.
FIG.2.

SEED HANDLING

It has been proposed that seed sowing be facilitated by supporting individual seeds at regular intervals along a tape or other elongate carrier. Among the prospective advantages of this proposal is the fact that such a carrier can be planted as a whole with the seeds spaced at the proper distance for the crop in question and without subsequent thinning being required. The manner of support for the seeds by the carrier will, of course, need to be such as to permit germination and subsequent growth, and this may involve use of a material for the carrier which will 'break up' in the soil.

However this more general proposal is subject to some difficulty in practical realization. A primary difficulty arises from the nature of seeds themselves in that a given variety may vary considerably in size and/or shape. This has led to proposals for the use of pneumatic handling apparatus whereby seeds are picked up and held by vacuum for conveyance to the carrier. Notwithstanding some improvement in handling, at least to the extent of avoiding manual handling, these last proposals have not proved entirely satisfactory. The previously proposed arrangements have been found to produce less accurate spacing of seeds along a carrier than is desirable, and perhaps more important they have not shown the desired reliability in conveying seeds individually to a carrier.

An object of the present invention is to reduce the above difficulties and, to this end, there is provided in one aspect of the invention apparatus for handling seeds or like small articles comprising: a longitudinally bored elongate member mounted at one end for cyclic movement of the other, free end around a closed path through an article supply station and past an article receiving station; valve means for selectively applying a vacuum to said member bore during movement through the supply station and to the receiving station whereat the vacuum is cut off from said member; and means for vibrating and for applying draught over said member after movement through the supply station and before reaching the receiving station.

In order that this and other aspects of the invention may be more clearly understood, the same will now be described by way of example with reference to the accompanying drawings, in which:

FIG. 1 illustrates one embodiment of apparatus according to the invention in diagrammatic side view;

FIG. 2 illustrates part of the embodiment of FIG. 1 in diagrammatic plan view.

Figure 3:
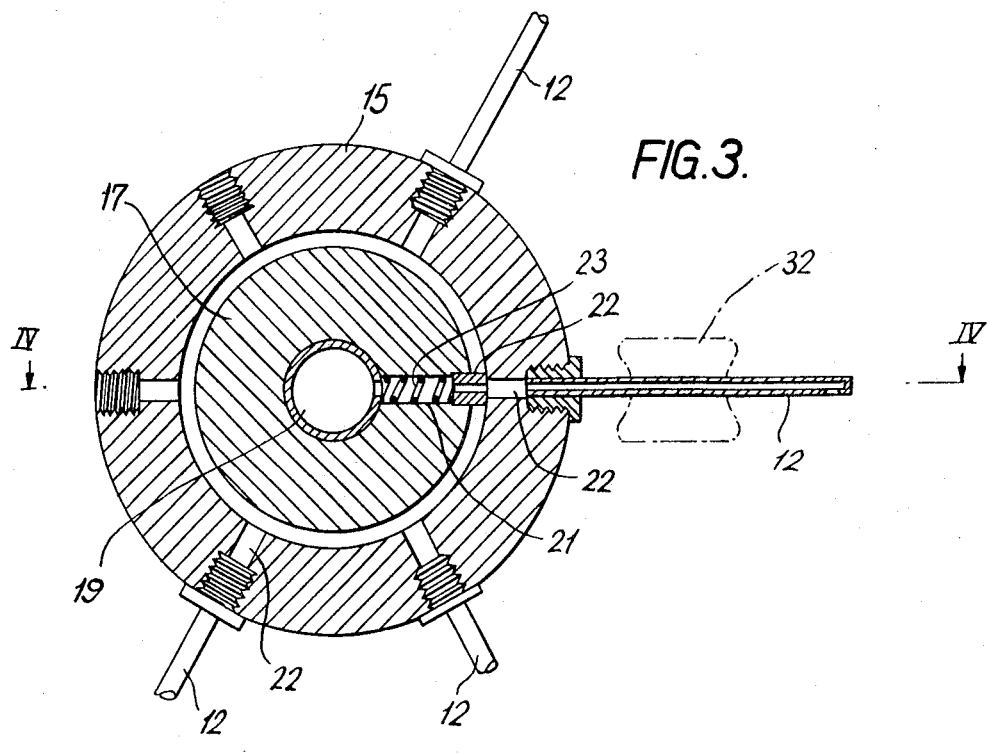
FIGS. 3 and 4 illustrate part of such embodiment in more detail in sectional views.

The illustrated embodiment comprises a motor 1 as prime mover, and a pump 2 to activate a vacuum line 3 and a pressurized airline 4. A hollow drum 5 is rotated about its axis by the motor 1 by way of a pulley wheel 6 fixed on the motor shaft, a further pulley wheel 7 parallel to pulley wheel 6, a belt 8 coupling pulley wheels 6 and 7, a sprocket 9 fixed for rotation with pulley wheel 7, a further sprocket 10 fixed for rotation with the drum 5, and a chain 11 coupling the sprockets 9 and 10.

A longitudinally bored needle 12 is mounted at one end to project radially from the drum 5, the mounting being such as to communicate the needle bore with the drum interior. Below the drum is located a trough 13 which serves as a seed supply station, and a funnel 14 which serves as a seed receiving station, the needle passing through the trough and past the funnel mouth during rotation of the drum.

During operation the drum rotates in a clockwise sense, as seen in FIG. 1, and vacuum is applied to the needle bore by way of the drum interior except for an interruption when the drum passes the funnel. The needle bore is opened to atmosphere at, or towards, the free end of the needle, and seed from a heap in the trough is picked up and held by the vacuum at such opening as the needle passes through the trough, the held seed being conveyed towards the funnel and released into the funnel mouth when the vacuum is interrupted. Rather than simply interrupt the vacuum, it is preferred that pressurized air be applied to the needle bore. This is desirable not so that the held seed be positively ejected from the needle, but to clear the needle bore of any foreign matter, such as dressing from the seed, dust, or the like, which may have been drawn in by the vacuum.

Figure 4:
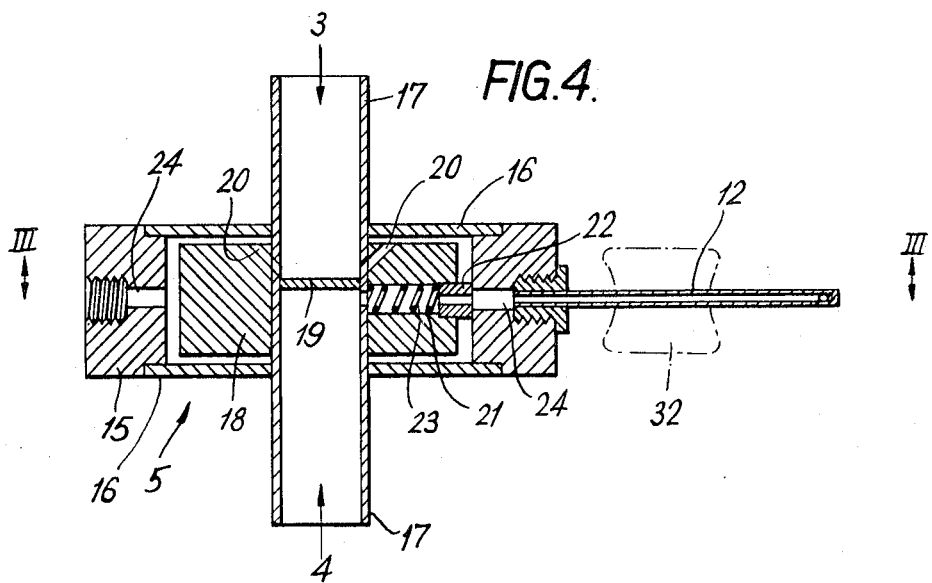

Valve means for the selective application of vacuum and release thereof, together with pressurized air application or not, is conveniently located within the drum and FIGS. 3 and 4 show one arrangement for this purpose. The drum comprises an outer annular part 15 and a pair of side plates 16, the whole being coaxially mounted with and for rotation about a fixed hollow shaft 17. A disc 18 is fixed coaxially with the shaft 17 within and out-of-contact with the drum. The portion of the shaft 17 which passes through the disc 18 has a block 19 fitted in its interior to prevent communication between the shaft ends. The disc and shaft are bored at 20 to communicate one end of the shaft interior with the space between the drum and disc, and the one end of the shaft is connected to the vacuum line 3 to apply vacuum to the drum interior. The disc and shaft are also bored radially at 21 to communicate the disc periphery with the other end of the shaft interior which is connected with the pressurized airline 4. However, pressurized air is not applied to the drum interior since a bored sealing washer 22 is located in a counter bore in the outer end of bore 21 and urged outwardly by a spring 23 in bore 21 to sealingly engage the inner periphery of the annulus 15. Finally the annulus 15 is radially bored at 24 to receive the needle 12 and communicate the needle bore with the drum interior.

During operation with the lines 3 and 4 actuated, the drum 5 is rotated around the disc 18 and the needle bore is subject to vacuum during almost the whole of each cycle of rotation. The exception to this is when the bore 24 passes over the washer 22, whereupon the application of vacuum to the needle bore is interrupted. In addition, pressurized air is applied to the needle interior at this juncture, when the bore 24 passes over that in the washer 22.

In practice there may be a number of bores 24 provided at regular angular spacings around the drum for use with a corresponding number of needles, and it will be noted that no duplication of valve arrangement is required in this connection. Also, it is to be noted that the position at which the vacuum is interrupted for the needle, or successive needles, is determined by the angular disposition of the bore 21 in disc 18. In the embodiment of FIG. 1, this position is preferably with the bore 21 extending substantially horizontally to the right, whereby seed release occurs with the needle similarly disposed over the funnel 14.

Returning to other features of FIG. 1: seed can be fed to the trough 13 in any suitable manner, such as by way of a hopper, but it is desirable that the seed in the trough should not be spread by the needle movement therethrough to the extent that no seed is picked up, while at the same time it is undesirable that the trough be overfilled. This situation is resolved by provision of a further pair of pulley wheels 25 and 26 coupled by a belt 27, with one wheel 25 fixed for rotation with pulley wheel 7, and the other 26 located generally between the latter wheel and the drum, adjacent the trough. A disc 28 is fixed for coaxial rotation with pulley wheel 26 and has an arm 29 mounted at one end eccentrically thereon to project parallel to the disc axis. A further arm 30 is pivotally mounted at one end on the outer end of arm 29 in a generally radial disposition relative to the arm 29, and carries a pusher plate 31 at its other end within the trough 13. During operation, the pusher plate is reciprocated longitudinally within the trough to heap the seed therein. Preferably for this purpose, the disc 28 rotates in an anticlockwise sense as seen in FIG. 1, whereby the pusher plate is lifted during its return movement from the heap.

Reference has been made in the introduction above to difficulty in reliably conveying seeds individually to a carrier. This difficulty may be partly eased by appropriate choice or design of the needle and choice of vacuum level to be used with given seeds. Thus: the needle opening against which seeds are to be held may be located at the extreme outer end of the needle or in the needle side adjacent such end; the peripheral configuration of the opening may be varied to noncircular shapes; the opening may diverge towards the needle exterior to provide a seating or recess; and the vacuum level may be varied to suit different seed weights. While these possible variations may serve to reduce or eliminate the occasions when no seed is picked up, it is still possible that additional seeds may lodge on that held by the opening.

This last difficulty has been met in the illustrated embodiment, with a high degree of success, by the provision of a bladed rotor 32 mounted for rotation on the needle 12. At the same time a nozzle 33, connected to the pressurized airline 4, is adjustably located adjacent the path of the needle following passage through the trough. During operation the needle picks up seed from the trough and then passes through a draught of air which rotates the rotor 32, and this in turn vibrates the needle. In the result, any surplus seeds normally fall from the needle back into the trough.

It might be mentioned in this connection that attempts to dislodge surplus seed by applying force in a single direction were not found to be as successful as that just discussed which effectively involves forces in two dimensions. It is thought that the present success arises from the rotary vibration set up in the needle by the rotor, although another factor may be the draught from the nozzle and, perhaps less likely with the present rotor configuration, a draught from the rotor.

In any event, the reliability of the present arrangement has been tested by detecting the passage of seeds through the stem of funnel 14. Such detection can be effected by use of transparent material, at least for part of the funnel stem, a light source 34 projecting a beam of light through the stem, and a photoelectric cell 35 responsive to the light beam on the other side of the stem. The beam is interrupted by passage of a seed therethrough and the cell output signal is pulsed as a result. The cell output pulses can then be counted or otherwise employed to indicate the reliability of individual seed conveyance.

A similar light source 36 and photoelectric cell 37 arrangement can be located for light beam interruption by the needle to indicate the rate of revolution of the drum or the total number of drum or needle revolutions.

Turning now to the question of seed support by a carrier, a pair of crimping rollers 38 and 39 are located below the funnel stem. More particularly, roller 38 is located below the stem, and the roller 39 is located alongside and in parallel with roller 38. Roller 38 has a number of recesses 40 spaced uniformly around its peripheral surface and spaced from the edges of such surface. Also, roller 38 is coupled for rotation in stepped manner with a pawl-and-ratchet mechanism 41 which mechanism is in turn coupled to the motor 1 by a mechanical linkage denoted at 42. The mechanism 41 and linkage 42 are so arranged relative to the drive coupling for the drum 5 that a recess 40 is positioned directly below the funnel stem as a seed is released from the needle 12, and the roller 38 is thereafter stepped round to so locate the next succeeding recess 40 before the next seed is released, due allowance being made for travel of the released seed through the funnel before stepping on roller 38.

Roller 39 on the other hand has a uniformly ribbed peripheral surface, and is urged against roller 38 for rotation therewith by adjustable screwdown means 43.

The carrier medium is preferably formed from two paper tapes 44 fed from supply reels 45, oversprung tensioning rollers 46, and then over and between the crimping rollers. Roller 38 is rotated in a clockwise sense as seen in FIG. 1, and a seed deposited on the tape above the uppermost recess 40 will, as the roller is stepped on, be retained in a pocket between the tapes as these are crimped together around the recess in question.

In order to reduce any risk of the paper tape passing around roller 38 to bump and move a seed deposited thereon, the recesses are preferably bored to communicate with a common passageway 47 connected to the vacuum line 3.

While the present invention has been more particularly described with reference to the illustrated embodiment, it is not intended to be limited by the detail of such embodiment. For example: the various drive arrangements can be of any suitable form, subject to there being adequate synchronization between the cyclic movement of the needle and the movement of the seed carrier material; the valve means, while conveniently located within the drum and reduced to simple form with few moving parts, can be of other form; and the carrier forming arrangement can be of other form, such as those previously proposed.

Also, while the invention has been developed in connection with seed handling, it is clearly suited to use in handling other small objects where difficulty arises in separation and individual conveyance.

I claim:

1. Apparatus for handling seedlike small articles, comprising: a longitudinally bored elongate member mounted at one end for cyclic movement of the other, free end around a closed path through an article supply station and past an article receiving station; valve means for selectively applying a vacuum to the bore of said member during movement through the supply station and to the receiving station whereat the vacuum is cut off from said member; means for applying draught over said member after movement through said supply station and before reaching said receiving station; and bladed means rotatably mounted on said member for actuation by said draught to vibrate said member.

2. Apparatus according to claim 1 wherein said valve means comprise a first valve member rotatable relative to a stationary second valve member with a space therebetween corresponding to the path of said elongate member between said supply station and said receiving station, said elongate member being mounted to project from said first valve member and to communicate said bore with said space, means for evacuating said space, and a sealing member mounted between said first and second members in the part of said space corresponding to said receiving station to discommunicate said bore from said space.

3. Apparatus according to claim 1, wherein said valve means is adapted to apply a positive pressure to said bore when said elongate member passes said receiving station.

4. Apparatus according to claim 3 wherein said sealing member is bored to communicate the bore of said elongate member with a positive pressure source.

5. Apparatus according to claim 1 wherein said supply station comprises a trough and an article heaping member reciprocatable therein in predetermined relation with the cyclic movement of said elongate member therethrough to heap articles in the path of the latter member.

6. Apparatus according to claim 5 wherein said article heaping member is arranged for lifting movement during its return stroke away from said path.

7. Apparatus according to claim 1 wherein said receiving station comprises a pair of crimping rollers of which one is provided with a sequence of discrete recesses around its crimping surface and within the lateral bounds of such surface, guide means for receiving an article from said elongate member and conveying the same to a predetermined zone of the path of movement of said crimping surface, means for passing tape material between said rollers to be driven thereby with part of said material passing over said zone, and means for driving said one roller in stepped manner to locate one of said recesses at said zone in predetermined relation with the cyclic movement of said elongate member.

8. Apparatus according to claim 7 wherein said one roller is bored to communicate said recesses with a vacuum source.

9. Apparatus according to claim 1 wherein said article receiving station comprises guide means for receiving an article from said elongate member and conveying the said article to article packaging means, and means for detecting the passage of articles along said guide means.

10. Apparatus for handling seedlike small articles, comprising: a longitudinally bored elongate member mounted at one end for cyclic movement of the other, free end around a closed path through an article supply station and past an article receiving station; valve means for selectively applying a vacuum to the bore of said member during movement through the supply station and to the receiving station whereat the vacuum is cut off from said member; and means for vibrating and applying draught over said member after movement through said supply station and before reaching said receiving station; said supply station comprising a trough and an article heaping member reciprocatable therein in predetermined relation with the cyclic movement of said elongate member therethrough to heap articles in the path of the latter member.

11. Apparatus according to claim 10 wherein said article heaping member is arranged for lifting movement during its return stroke away from said path.

12. Apparatus for handling seedlike small articles, comprising: a longitudinally bored elongate member mounted at one end for cyclic movement of the other, free end around a closed path through an article supply station and past an article receiving station; valve means for selectively applying a vacuum to the bore of said member during movement through the supply station and to the receiving station whereat the vacuum is cut off from said member; and means for vibrating and applying draught over said member after movement through said supply station and before reaching said receiving station; said receiving station comprising a pair of crimping rollers of which one is provided with a sequence of discrete recesses around its crimping surface and within the lateral bounds of such surface, guide means for receiving an article from said elongate member and conveying the same to a predetermined zone of the path of movement of said crimping surface, means for passing tape material between said rollers to be driven thereby with part of said material passing over said zone, and means for driving said one roller in stepped manner to locate one of said recesses at said zone in predetermined relation with the cyclic movement of said elongate member, said one roller being bored to communicate said recesses with a vacuum source.

* * * * *